March 29, 1966 E. JABLONSKY ETAL 3,242,824
HYDRAULIC POWER STEERING SYSTEM
Filed July 31, 1963 2 Sheets-Sheet 1

Inventors
ERICH JABLONSKY
HEINRICH WAGNER
by Albert M Zalkind

March 29, 1966  E. JABLONSKY ETAL  3,242,824
HYDRAULIC POWER STEERING SYSTEM
Filed July 31, 1963  2 Sheets-Sheet 2

United States Patent Office 3,242,824
Patented Mar. 29, 1966

3,242,824
HYDRAULIC POWER STEERING SYSTEM
Erich Jablonsky and Heinrich Wagner, Schwabisch Gmund, Germany, assignors to Zahnradfabrik Friedrichshafen, Aktiengesellschaft, Friedrichshafen am Bodensee, Germany
Filed July 31, 1963, Ser. No. 299,051
9 Claims. (Cl. 91—380)

This invention relates to booster power steering mechanisms, and particularly those which use hydraulic pressure fluid.

Prior art power boosting systems have been known wherein the steering column connects to an axially stationary steering worm, although the steering column is axially movable upon encountering a predetermined degree of steering resistance and such axial motion is utilized to control valving for a pressure fluid to a power boost piston and cylinder arrangement.

Another known type of boost mechanism comprises a steering column formed in two axially aligned sections which are connected through a yieldable member, such that when the steering wheel end of the column is twisted and meets a predetermined resistance, the relative rotative displacement between the two sections of the column is utilized for valving control.

Such arrangements as have been generally described above, take up considerable space in the axial extent of the column and the control appendages, and the present invention has for its primary object to provide a simpler construction and one which requires less space. Other objects and features of the invention will be apparent from the description to follow.

The essence of the invention is to provide an integral steering column which is threaded directly to the power piston within a bore thereof and is provided with a relatively flat radial flange arranged for valving control of a sleeve valve concentric with the steering column. Thus, when the steering column meets road resistance in the initial steering effort, the column translates axially due to its threaded connection with the power piston, the piston being in gear meshing connection with the steering mechanism, and such axial movement of the column controls the sleeve valve. The axial movement provided is that which amounts to the normal steering lost motion or "slack" normally experienced in the initial movement of the steering wheel. By utilizing the above described principle, a very compact mechanism is afforded.

A further feature of the invention resides in the use of a pressure relief valve built into the valve sleeve housing so that, upon a predetermined degree of pressure, a bypass from the pressure source to the pressure return line is afforded. This is of advantage where the steering boost mechanism is used in tractor-type vehicles where heavy pressure may be needed to actuate lifting mechanism and the like, thereby enabling the use of a single supply pump for such actuation, as well as for booster steering.

A detailed description of the invention now follows, in conjunction with the appended drawing, in which.

Figure 1:
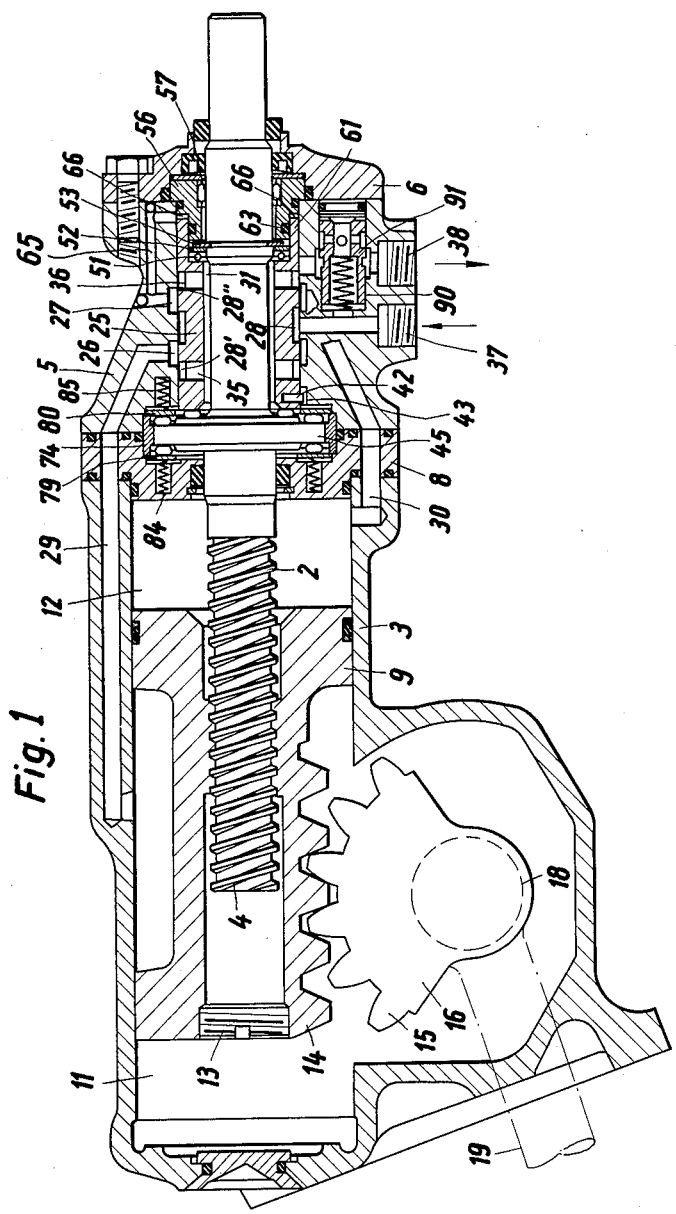
FIG. 1 is a longitudinal cross section of the entire mechanism.

Referring now to the drawing, a steering column 2 is shown which will be understood to be of integral construction for the length shown and which protrudes into the housing 3 and has a threaded connection with a power boost piston 9. Double acting piston 9 is provided with gear teeth 14, meshing with teeth 15 of gear segment 16 which rotates steering shaft 17 for actuation of a pitman arm 19 to effect steering in a well known manner. The housing is divided by the head of the piston into pressure chambers 11 and 12. The bore in the piston is sealingly closed by a screw cap 13 and the end 4 of the steering column extends into the sealed space.

A valve housing 5 is secured to the housing 3 via an intermediate flange 8 and a fluid passage 29 connects through flange 8 between housing 5 and the housing 3 to feed and exhaust pressure fluid from the chamber 11. Similarly, a passage 30 connects for fluid inlet and outlet from chamber 12 through flange 8 to housing 5.

The fluid passages terminate in respective grooves adjacent coacting grooves, all to be later described, in an axially movable but non-rotative valve sleeve 25. Thus, a pin 42 extends from the valve sleeve to a slot 43 in housing 5, whereby the valve sleeve is keyed against rotation and restricted to axial motion. The valve sleeve and the steering column are locked together for axial movement by means of a needle bearing 50 and a split ring 53 disposed in a groove of the column, which ring bears against the outer-ring-like race 52 of a thrust bearing comprising the balls 51.

Accordingly, should the steering column shift axially it will carry valve sleeve 25 with it for the purpose of aligning various pressure and exhaust passages in order to control pressure to shift piston 9 to the left or right depending on direction of steering desired.

The valving passages are generally conventional. Thus a pressure supply pump source leads to the inlet port 37 (such source not being shown) which connects through the bore shown to an annular groove 28 in the periphery of the valve sleeve 25. In the neutral position of piston 9, that is wheels straight ahead, the pressure feed passes from groove 28 to the annular pressure feed groove 26 in the valve housing body 5 and thence to chamber 11 via passage 29 and likewise to annular pressure feed groove 27 and thence to piston chamber 12 via passage 30. Thus, there is fluid on both sides of the piston. However, there is continuous fluid circulation since outlet 38 connects with annular space 31 between the steering columns and the bore surface in the valve sleeve, which space communicates with exhaust bores 35 and 36 for chambers 11 and 12 respectively, via grooves 28' and 28", respectively. Accordingly, in neutral position, although the pressure in the piston chambers is sufficient to maintain the chambers filled with fluid, the pressure source discharges constantly to the exhaust. Depending upon the relative axial position of the valve sleeve, pressure fluid can pass either through groove 26 or 27 to feed chamber 11 or chamber 12, respectively. When one chamber is thus being fed, the other chamber is being exhausted in the usual manner as effected by valve sleeve shift.

The steering column 2 is provided with an integral flange 45 supported within a ring 74 that is clamped between the housings 3 and 5. The flange 45 abuts needle bearings such as 47, 48 and 50 which in turn abut pressure rings 79 and 80 maintained against the respective peripheral shoulders or edges 76 and 77 of the ring 74, by respective pluralities of springs 84 and 85, socketed respectively in housings 3 and 5 and under initial compression. It will be understood that there is a suitable angular distribution of such springs so as to maintain balanced forces on the flange 45 via the needle bearings 47 and 48. The rings 79 and 80 are axially reciprocal in respective shallow chambers 82 and 83 and the flange 45 bears via needle bearing 50, previously mentioned, against the sleeve valve 25. The axial dimension of the chambers 82 and 83 is designated by the reference character "S" in each instance and this represents the lost motion or slack through which the steering column 2 can move during the initial steering effort. Flange 45 is thus normally centered by the springs 84 and 85.

Accordingly, between the bearings 50 and the bearings 51, the valve sleeve 25 is constrainedly secured to move with the steering column, insofar as axial motion is concerned. The steering column itself is suitably supported in a needle bearing 57 having a raceway collar 56 carried in an end cap 6 which closes the end of the housing 5. The bearing 56 is suitably sealed off by gaskets as shown, to prevent pressure leakage along the steering column and it extends inside an end skirt 61 of the valve sleeve 25, being sealed thereagainst by the gasket 63 and also being sealed with respect to housing 5 by the gasket 64. The peripheral surface at the skirt end of the valve sleeve forms a piston 62 facing into a chamber 66, the end of the chamber being formed by a radial internal shoulder of collar 56, as shown. Chamber 66 communicates via a line 65 with the annular groove 27 and is thus subjected to inlet pressure. The chamber 66 is sealed by gaskets 63 and 64 against leakage to the annular space 31 to prevent leakage to the return port 38. The purpose of piston 62 and chamber 66 is to balance the end pressure on steering column 2.

Thus, the front end area 4 of the steering column will have pressure impinging thereon by normal looseness of the thread on the steering column when there is pressure in chamber 12 which would result in an axial shift of steering column 2, along with valve sleeve 25. However, the chamber 66 being in constant communication via line 65 with the groove 27, results in pressure on the piston surface 62 at the end of the valve sleeve which cancels out the pressure on the end area 4 of the steering column and, accordingly, the steering column will not shift by virtue of end pressure thereon.

The valve housing 5 has a bore 90 in which is slidably arranged a relief valve piston 91 having an axial bore 93 which sockets the end of a compression spring 94, the other end of the spring bearing against the end of bore 90, as shown. The bore 93 forms a passage which connects with the pressure supply of port 37 by the axial bore shown at the left end of the spring 94, and also connects with an end spacing 95 which therefore serves as a pressure chamber. Bore 93 likewise communicates with radial bores 96 which will be seen to lead into an annular groove 97 in the valve piston 91, which groove 97 can communicate with an annular groove 98 formed in the exhaust passageway leading to outlet port 38. In the position shown for valve piston 91, such communication is cut off. However, the end 101 of the valve piston has a larger area than the end 100. Accordingly, when sufficient pressure is built up in the chamber 95, such pressure coming from the inlet, to overcome the spring 94, valve piston 91 can shift to the left and pressure fluid will then directly bypass from port 37 to port 38, via 96–97–98.

*Operation*

Figure 2:
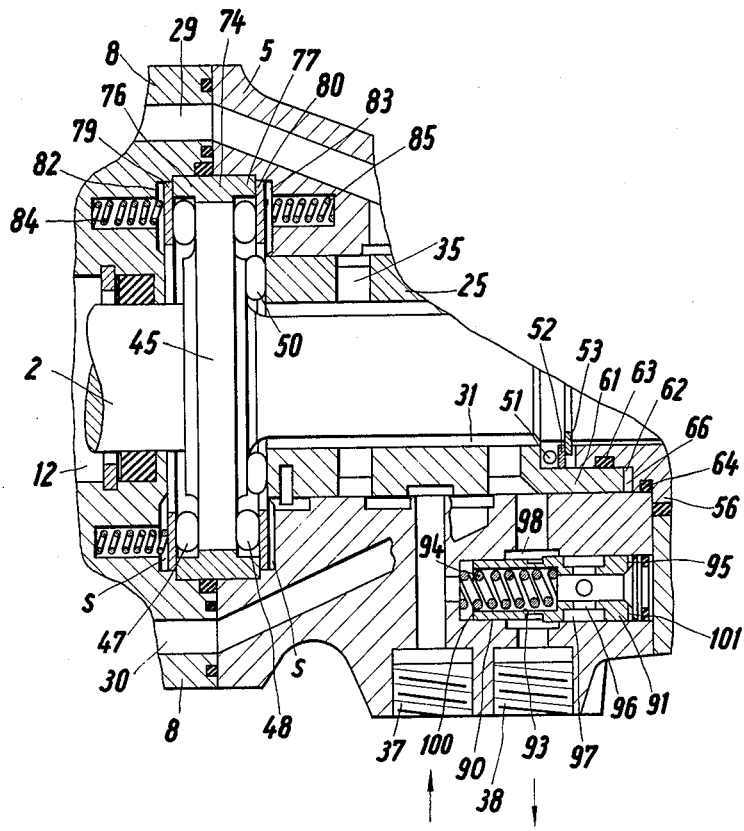
FIG. 2 is a magnified portion of FIG. 1.

When the steering column is rotated for steering purposes, for example, toward the right, a certain amount of road resistance prevents immediate translation of piston 9 which would otherwise be effected by virtue of the threaded connection between the column and the piston. The effect then is to axially shift the steering column. If the connection between the column and the piston be a left hand thread, the movement of the column will be toward the right, as viewed on FIGS. 1 and 2, which will serve to move the integral flange 45, thus compressing the springs 85 via the needle bearing 45 until the pressure ring 80 takes up the slack "S" in the chamber 83 and meets the bottom wall thereof. The pressure ring 79 will, however, remain in place against the fixed ring 74 since springs 84 will expand. The movement to the right of the steering column will carry the valve sleeve 25 along with it and thus establish communication between inlet port 37 and channel 30 to feed pressure to piston chamber 12 and exhaust chamber 11. Such pressure will act on piston 9 to augment the rotative force on gear segment 16 effectedly continued rotation of the steering column. The same action is had if the steering column be rotated to the left, except that in such case the slack "S" at the left side of flange 45 is taken up and the pressure is then fed to chamber 11 while chamber 12 then exhausts.

In the event that the wheels of the vehicle meet road shock, such shock will be transmitted to the piston and assuming the direction of shock is such that the piston is moved towards the right, i.e., toward the chamber 12, the steering column and the valve sleeve 25 will likewise shift. This relative motion of the valve sleeve with respect to the housing 5 opens fluid pressure to the piston chamber 12 for absorbing shock. The same action occurs in the event of shock which moves the piston 9 to the left. Accordingly, road shock is absorbed directly by the pressure fluid acting as a cushion without having to feed such pressure via any intermediate components between the steering gear and the power booster piston.

Having thus described the invention, we are aware, that various changes may be made without departing from the spirit thereof and, accordingly, do not seek to be limited by the precise illustration herein given except as set forth in the appended claims.

We claim:

1. A booster steering mechanism comprising a double-ended piston for actuation of a steering mechanism and a steering column having a threaded drive connection with said piston; a lost motion mechanism connected to said column and having an integral flange movable therewith and said column being supported for rotative and axial movement wherein lost motion axial movement is effected upon initial rotation of said column, a pressure chamber for each end of said piston, a valve means disposed for operation by said flange to selectively control pressure of said chambers responsive to direction of axial movement of said column, said lost motion mechanism further comprising resilient elements disposed to act on both sides of said flange for effecting an initial centered condition of said steering column, said valve means comprising a valve sleeve concentrically arranged about said steering column and carried thereby for movement therewith, said steering column having mounting means permitting limited free movement thereof, whereby said resilient elements may effect said centered condition to neutrally position said valve sleeve whereat no pressure is effected thereby in either chamber for moving said piston.

2. A booster steering mechanism as set forth in claim 1, a housing for said valve sleeve, said housing having an inlet port for pressure supply, coacting passageways between said valve sleeve and said housing for directing pressure fluid to and from said chambers, said steering column extending into said piston and having an end exposed to pressure of one of said chambers, a pressure balancing piston carried by said column and pressure feed means for feeding pressure fluid to said balancing piston to counteract the effect of pressure on said end of said column.

3. In a booster steering mechanism as set forth in claim 2, said pressure balancing piston comprising a peripheral edge of said valve sleeve, said edge being at the end of a skirt extending into a pressure chamber and said pressure feed means comprising a fluid pressure connection communicating said chamber with an inlet pressure passageway of the other chamber of said piston.

4. A booster steering system comprising a double-ended piston for actuation of a steering mechanism and a steering column having a steering drive connection therewith; a lost motion mechanism connected to said column and movable therewith, said steering drive connection permitting relative motion between said column and said piston, whereby initial steering effort exerted on said piston by said column effects lost motion movement of said column due to resistance of said mechanism operative to move said column relative to said piston; a pressure chamber for each end of said piston, a valve means operative by lost motion movement of said column to control pressure of said chambers selectively responsive to direction of lost motion movement, said valve means comprising a valve sleeve concentrically arranged about said steering column, a housing for said valve sleeve said housing and said valve sleeve having passages communicable selectively for effecting fluid pressure to and from respective cylinders, said housing having an inlet and an outlet port and a pressure relief valve intermediate said inlet and outlet ports, said valve sleeve being radially spaced from said column to effect an exhaust passageway, said relief valve passing through a bore in said housing in communication with said exhaust passageway and with said outlet port, said relief valve comprising a sleeve having an axis parallel to the axis of said first-mentioned valve sleeve.

5. A booster steering mechanism comprising a double-ended piston for actuation of a steering mechanism and a steering column having a steering drive connection therewith, a valve means actuatable by said steering column, a housing for said valve means, a double-ended piston controlled by said valve means for effecting steering boost, said housing having pressure supply and pressure return ports, a pressure relief valve in said housing comprising a sleeve having an axial bore communicating at one end with said pressure supply port, a pressure chamber at the other end of said sleeve communicating with said bore, the end area of said sleeve in said pressure chamber being greater than the other end area of said sleeve, said other end area communicating with said pressure supply port, a spring biasing said sleeve toward said chamber, said sleeve having valve means whereby when pressure in said chamber overcomes the bias of said spring, said sleeve is shifted wherein said valving means is operative to bypass fluid from said pressure supply port to said pressure return port.

6. A booster steering mechanism comprising a double-ended piston for actuation of a steering mechanism and a steering column having a threaded drive connection with said piston; a lost motion mechanism connected to said column and comprising an element integrally movable therewith and said column being supported for rotative and axial movement wherein lost motion axial movement is effected upon initial rotation of said column, a pressure chamber for each end of said piston, a valve means disposed for operation by said element to selectively control pressure of said chambers responsive to direction of axial movement of said column, said lost motion mechanism further comprising resilient means acting on said element to maintain an initial position of said column, said resilient means comprising a collar having opposite shoulders, said element being within said collar and axially movable and slidably guided therein, a ring abutting each shoulder and respective spring elements for maintaining each said abutment, a housing member adjacent each side of said collar and provided with respective recesses for receiving said rings up to a respective limiting position for either direction of motion of said element.

7. A booster steering system comprising a double-ended piston for actuation of a steering mechanism and a steering column having a steering drive connection therewith; a lost motion mechanism having an element connected to said column and movable therewith, said steering drive connection permitting relative motion between said column and said piston, whereby initial steering effort exerted on said piston by said column effects lost motion movement of said column due to resistance of said steering mechanism operative to move said column and said element relative to said piston; a pressure chamber for each end of said piston wherein an end of said column is exposed to pressure in one of said chambers, a valve sleeve concentric with said column and coaxial with said piston and carried for axial movement therewith and operative by lost motion movement of said column to control pressure of said chambers selectively responsive to direction of lost motion movement to effect booster force, and means acting on said element to maintain an initial position of said column wherein said piston effects no booster force, said valve sleeve having a peripheral edge remote from said piston, means providing a chamber in which said edge is reciprocal, and means providing a pressure feed to said latter chamber to balance the force on said column effected by pressure in said one chamber.

8. A system as set forth in claim 7, including a housing for said valve sleeve, means intermediate said valve sleeve and said housing for restraining said sleeve to axial motion, and means connecting said sleeve to said column effecting axial movement of said sleeve with said column and permitting relative rotation therebetween.

9. A booster steering system comprising a double-ended piston for actuation of a steering mechanism and a steering column having a steering drive connection therewith; a housing having fluid passages, said steering column extending into said housing, a lost motion mechanism connected to said column within said housing and actuated thereby, said steering drive connection permitting relative axial motion between said column and said piston, whereby initial steering effort exerted on said piston by said column effects lost motion movement of said column due to resistance of said steering mechanism operative to move said column relative to said piston; a pressure chamber for each end of said piston, a valve sleeve within said housing carried concentrically on said steering column and operative by lost motion mechanism movement of said column to control pressure in said chambers by coaction with said fluid passages and selectively responsive to direction of lost motion movement of said column, said lost motion mechanism comprising a flange integral with said steering column and spring means abutting opposite sides of said flange to effect an initial position thereof wherein said system has no booster effect, said steering column having mounting means permitting limited free movement thereof, whereby said spring means may effect said centered condition to neutrally position said valve sleeve whereat no pressure is effected thereby in either chamber for moving said piston.

References Cited by the Examiner

UNITED STATES PATENTS

| 1,694,143 | 12/1928 | Roberts | 91—380 |
| 2,410,049 | 10/1946 | Davis | 91—380 |
| 2,928,423 | 3/1960 | Rockwell | 91—468 |
| 2,954,837 | 10/1960 | Ziskal | 91—380 |

SAMUEL LEVINE, *Primary Examiner.*

FRED E. ENGELTHALER, *Examiner.*

P. E. MASLOUSKY, *Assistant Examiner.*